(12) United States Patent
Konoura et al.

(10) Patent No.: US 10,249,858 B2
(45) Date of Patent: Apr. 2, 2019

(54) BATTERY SUPPORT STRUCTURE

(71) Applicant: HONDA MOTOR CO., LTD., Tokyo (JP)

(72) Inventors: Hisashi Konoura, Wako (JP); Shohei Hikomen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 15/435,611

(22) Filed: Feb. 17, 2017

(65) Prior Publication Data

US 2017/0250387 A1    Aug. 31, 2017

(30) Foreign Application Priority Data

Feb. 29, 2016  (JP) ................. 2016-037727

(51) Int. Cl.
| | | |
|---|---|---|
| *F16M 1/00* | (2006.01) | |
| *H01M 2/10* | (2006.01) | |
| *B60R 16/04* | (2006.01) | |

(52) U.S. Cl.
  CPC ........... *H01M 2/1083* (2013.01); *B60R 16/04* (2013.01)

(58) Field of Classification Search
  USPC ...................................................... 248/674
  See application file for complete search history.

(56) References Cited

U.S. PATENT DOCUMENTS

| | | | | |
|---|---|---|---|---|
| 2,994,395 A | * | 8/1961 | Hall ........................ | B60R 16/04 180/68.5 |
| 3,420,489 A | | 1/1969 | Doggett et al. | |
| 3,557,895 A | * | 1/1971 | Thomas .................. | B60R 16/04 180/68.5 |
| 3,866,704 A | * | 2/1975 | Bowers ................... | B60R 16/04 180/68.5 |
| 4,317,497 A | * | 3/1982 | Alt ....................... | H01M 2/1083 180/68.5 |

(Continued)

FOREIGN PATENT DOCUMENTS

| | | |
|---|---|---|
| JP | 49-027119 U1 | 3/1974 |
| JP | 52-141134 U1 | 10/1977 |

(Continued)

OTHER PUBLICATIONS

Japanese Office Action, Application No. 2016-037727, dated Dec. 5, 2017, with English Translation Included, 29 pages.

(Continued)

*Primary Examiner* — Monica E Millner
(74) *Attorney, Agent, or Firm* — Rankin, Hill & Clark LLP

(57) ABSTRACT

A battery support structure includes a pedestal section configured to come in contact with a first surface of a battery in order to support the battery, a locking protruding part formed at the pedestal section, and a locking part that includes an inserting part arranged to be inserted in a first locking hole and that is configured to come in contact with at least a portion of a third surface of the battery facing the opposite side of the first surface, wherein the battery is supported in a state in which the inserting part is inserted in the first locking hole, and a second locking hole is formed in the locking protruding part at a position deviated a predetermined distance from the first locking hole toward a side closer to the third surface of the supported battery.

11 Claims, 6 Drawing Sheets

(56) References Cited

U.S. PATENT DOCUMENTS

| | | | | |
|---|---|---|---|---|
| 4,327,809 | A | * | 5/1982 | Fenstermaker ......... B60R 16/04 180/68.5 |
| 4,520,887 | A | * | 6/1985 | DiFazio ............. H01M 2/1083 180/68.5 |
| 4,754,827 | A | * | 7/1988 | Hirabayashi ........... B60R 16/04 180/68.5 |
| D321,856 | S | * | 11/1991 | Whitley, II .................. 180/68.5 |
| 5,086,860 | A | * | 2/1992 | Francis ............... H01M 2/1083 180/68.5 |
| 6,290,013 | B1 | * | 9/2001 | Bienenstein, Jr. ...... B60R 16/04 180/68.5 |
| 6,827,169 | B1 | * | 12/2004 | Van Hout ............... B60R 16/04 180/68.5 |
| 7,014,002 | B2 | * | 3/2006 | Mizuta ................... B60R 16/04 180/68.5 |
| 8,091,669 | B2 | * | 1/2012 | Taneda ..................... B60K 1/04 180/68.5 |
| 9,455,425 | B2 | * | 9/2016 | Park ...................... H01M 2/105 |
| 2005/0224683 | A1 | * | 10/2005 | Hirayu ................... B60R 16/04 248/500 |

FOREIGN PATENT DOCUMENTS

| | | |
|---|---|---|
| JP | 60-016675 U1 | 2/1985 |
| JP | 60-082049 | 6/1985 |
| JP | 60-164108 U1 | 10/1985 |
| JP | 61-294797 A | 12/1986 |
| JP | 62-178276 U1 | 11/1987 |
| JP | 04-118843 U1 | 10/1992 |
| JP | 10-141347 A | 5/1998 |
| JP | 2005-067489 A | 3/2005 |
| JP | 3758475 | 1/2006 |
| JP | 2007-131158 A | 5/2007 |
| JP | 4063098 | 1/2008 |
| JP | 2010-075933 A | 4/2010 |
| JP | 2012-192831 A | 10/2012 |
| JP | 2014-012509 A | 1/2014 |

OTHER PUBLICATIONS

Japanese Office Action with English Translation dated May 15, 2018, 14 pages.

* cited by examiner

BATTERY SUPPORT STRUCTURE

CROSS-REFERENCE TO RELATED APPLICATION

Priority is claimed on Japanese Patent Application No. 2016-037727, filed on Feb. 29, 2016, the contents of which are incorporated herein by reference.

BACKGROUND OF THE INVENTION

Field of the Invention

The present invention relates to a battery support structure.

Description of Related Art

In the related art, a battery configured to supply electric power to various electrical components is mounted in an engine room of a vehicle.

For example, Japanese Patent No. 3758475 discloses a battery support structure including a tray (a pedestal section) configured to support a battery attached to a front side member, a pressing member (a pressing plate) configured to press an upper surface of a cover covering the battery, and a connecting rod (a fastening rod) fixed to both end portions of the pressing member and engaged with a locking hole of the tray.

In addition, Japanese Patent No. 4063098 discloses a battery support structure including a battery placing bracket (a pedestal section) fixed to a side member on which a battery is placed, a pressing member (a pressing plate) configured to press the battery downward, and a pressing rod (a fastening rod) fixed to both end portions of the pressing member and inserted into a locking hole of the battery placing bracket.

SUMMARY OF THE INVENTION

However, in the battery support structure of the related art, when an inertial force acts on the battery such that is moves upward, a force directed upward is applied to the fastening rod via the pressing plate. Accordingly, pressing of the battery may be released. Accordingly, in the battery support structure of the related art, there is a room for improvement in stably holding the battery.

An aspect of the present invention is directed to provide a battery support structure capable of stably holding a battery.

An aspect of the present invention employs the following configuration in order to solve the above-mentioned problems.

A battery support structure according to an aspect of the present invention includes a pedestal section configured to come in contact with at least a portion of a first surface of a battery in order to support the battery; a locking protruding part formed on the pedestal section so as to be disposed along a second surface of the battery neighboring the first surface; and a locking part that includes an inserting part arranged to be inserted in a first locking hole formed in the locking protruding part and that is configured to come in contact with at least a portion of a third surface of the battery facing the opposite side of the first surface, wherein the battery is supported in a state in which the inserting part is inserted in the first locking hole, and a second locking hole is formed in the locking protruding part at a position deviated a predetermined distance from the first locking hole toward a side closer to the third surface of the supported battery.

In the aspect of the present invention, when an inertial force is applied to the battery in a direction separating away from the pedestal section, i.e., a direction in which a battery is displaced from a first surface side of the battery toward the third surface side, a force in a direction from the first surface side of the battery toward the third surface side of the battery is applied to the locking part in contact with the third surface of the battery. Here, since the locking part includes the inserting part that is able to be inserted in the first locking hole formed in the locking protruding part, when the force is applied to the locking part, the locking protruding part may be broken by the inserting part.

According to the aspect of the present invention, since the second locking hole is formed in the locking protruding part at the position deviated a predetermined distance from the first locking hole toward the third surface side of the supported battery, even when the force in the direction from the first surface side of the battery toward the third surface side of the battery is applied to the locking part and breakage caused by cracks due to the load from the inserting part occurs in the portion of the locking protruding part among the surroundings of the first locking hole located closer to the third surface side of the battery than the first locking hole, advance of the cracks in the second locking hole can be stopped to prevent the locking protruding part from being completely broken. Accordingly, since the inserting part is inserted in the second locking hole, locking between the locking part and the locking protruding part can be maintained, and displacement of the battery from the first surface side toward the third surface can be restricted. Accordingly, the battery can be stably held. Further, the locking protruding part may be formed by the same part as the pedestal section by forming the pedestal section such that the pedestal section has the locking protruding part, and as described below, the pedestal section may be formed by providing separate parts and welding the parts.

In the above-mentioned battery support structure, the first locking hole may be formed such that a width thereof decreases from a side closer to the first surface toward a side closer to the third surface of the supported battery.

According to the aspect of the present invention, since the first locking hole has a width that decreases from a side closer to the first surface toward a side closer to the third surface of the supported battery, the portion of the first locking hole located closer to the first surface side is wider than the portion located closer to third surface side, and the inserting part can be easily inserted in the portion of the first locking hole located closer to the first surface side. In addition, as the inserting part is displaced toward the third surface side by tightening or the like of the locking part, the inserting part can be guided to a corner section of the first locking hole at the first surface side, and the inserting part can be securely locked to a defined position. Accordingly, improvement of insertion of the inserting part into the first locking hole and improvement of fixing strength between the first locking hole and the inserting part are compatible.

In the above-mentioned battery support structure, the first locking hole may be formed to have at least one apex at a side closer to the third surface of the supported battery, and the second locking hole may be formed on a straight line that connects the apex and the third surface of the supported battery.

According to the aspect of the present invention, since a place of the first locking hole at which occurrence of cracks due to the load from the inserting part begins is restricted to an apex at the third surface side and the second locking hole corresponding to the place is formed, advance of the cracks that advances from the apex toward the third surface side can be reliably stopped in the second locking hole. Accordingly, the locking protruding part can be reliably prevented from being completely broken.

In the above-mentioned battery support structure, the second locking hole may be formed along an opening edge of the first locking hole.

According to the aspect of the present invention, since the portion of the locking protruding part between the first locking hole and the second locking hole is formed to extend with a substantially constant width, the load from the inserting part inserted in the first locking hole can be distributed in the portion between the first locking hole and the second locking hole. Accordingly, stress concentration to the portion between the first locking hole and the second locking hole can be prevented, and strength with respect to the breakage can be improved. Accordingly, locking between the locking part and the locking protruding part can be maintained, and displacement of the battery from the first surface side toward the third surface can be restricted. Accordingly, the battery can be stably held.

In the above-mentioned battery support structure, a portion of an outer edge portion of the locking protruding part that locates closer to the third surface side than the second locking hole may be formed so as to extend along an opening edge of the second locking hole.

According to the aspect of the present invention, since the portion of the locking protruding part closer to the third surface of the battery than the second locking hole is formed to extend with a substantially constant width, when the inserting part is inserted in the second locking hole, the load from the inserting part can be distributed in the portion of the locking protruding part located closer to the third surface of the battery than the second locking hole. Accordingly, stress concentration to the portion of the locking protruding part located closer to the third surface of the battery than the second locking hole can be prevented, and strength with respect to the breakage can be improved. Accordingly, locking between the locking part and the locking protruding part can be maintained, and displacement of the battery from the first surface side toward the third surface can be restricted. Accordingly, the battery can be stably held.

In the above-mentioned battery support structure, a welding section fixed in a state in which the locking protruding part and the pedestal section are welded to each other may be provided, and the welding section may be formed so as to intersect in a first direction and a second direction, the first direction being a direction parallel with the first surface plane and the third surface plane, and the second direction being a direction perpendicular to the first direction.

According to the aspect of the present invention, since the locking protruding part and the pedestal section can be easily formed by providing them as separate parts and the welding section between the locking protruding part and the pedestal section is formed so as to intersect in the first direction in which the first surface plane and the third surface plane of the battery are parallel, it is possible to strongly fix the pedestal section and the locking protruding part with respect to the load in the first direction. For this reason, even when an inertial force in the direction in which the battery is displaced from the first surface side toward the third surface is applied to the battery and the force is applied to the locking protruding part in the first direction via the locking part, the locking protruding part can be prevented from being separated from the pedestal section.

Further, since the pair of welding sections is formed so as to intersect in the second direction, strength with respect to separation of the locking protruding part from the pedestal section due to the load in the first direction can be improved. Accordingly, separation of the locking protruding part from the pedestal section can be prevented.

Accordingly, a position of the locking part with respect to the pedestal section can be fixed, and displacement of the battery from the first surface side toward the third surface can be restricted. Accordingly, the battery can be stably held.

In the above-mentioned battery support structure, a positioning section configured to determine a relative position between the pedestal section and the locking protruding part may be formed at the pedestal section and the locking protruding part.

According to the aspect of the present invention, assembly precision between the pedestal section and the locking protruding part can be improved by the positioning hole. Accordingly, the battery support structure having a small production tolerance can be provided.

In the above-mentioned battery support structure, a mount section that is fixed to a front side frame extending in a vehicle forward/rearward direction and that is configured to support a power plant may be provided, and the pedestal section may be fixed to the mount section via a mount section-side support member.

According to the aspect of the present invention, the pedestal section can be fixed to the front side frame via the mount section without largely increasing the number of components between the pedestal section and the front side frame. Accordingly, the battery can be stably supported.

In the above-mentioned battery support structure, the pedestal section may be fixed to a front side frame and a damper housing via a frame-side support member, the front side frame extending in the vehicle forward/rearward direction, and the damper housing being connected to an outer portion of the front side frame located outside in the vehicle width direction.

According to the aspect of the present invention, the battery can be supported by both of the front side frame and the damper housing. Accordingly, the battery can be stably supported.

In the above-mentioned battery support structure, the locking part may include a belt-shaped section formed along the third surface of the supported battery and an extension section that extends from the inserting part along the second surface of the supported battery and that is fastened to the belt-shaped section by a nut at a fastening section, and a diameter of the extension section in the vicinity of the fastening section may be smaller than a diameter of the inserting part.

According to the aspect of the present invention, even when the diameter of the inserting part is increased in order to prevent the inserting part from being buckled and being separated from the locking protruding part before the occurrence of the cracks in the first locking hole due to the load from the inserting part, since nut fastening torque of the fastening section can be held at a relatively small level, improvement of strength and improvement of workability of the inserting part are compatible.

DETAILED DESCRIPTION OF THE INVENTION

Figure 1:
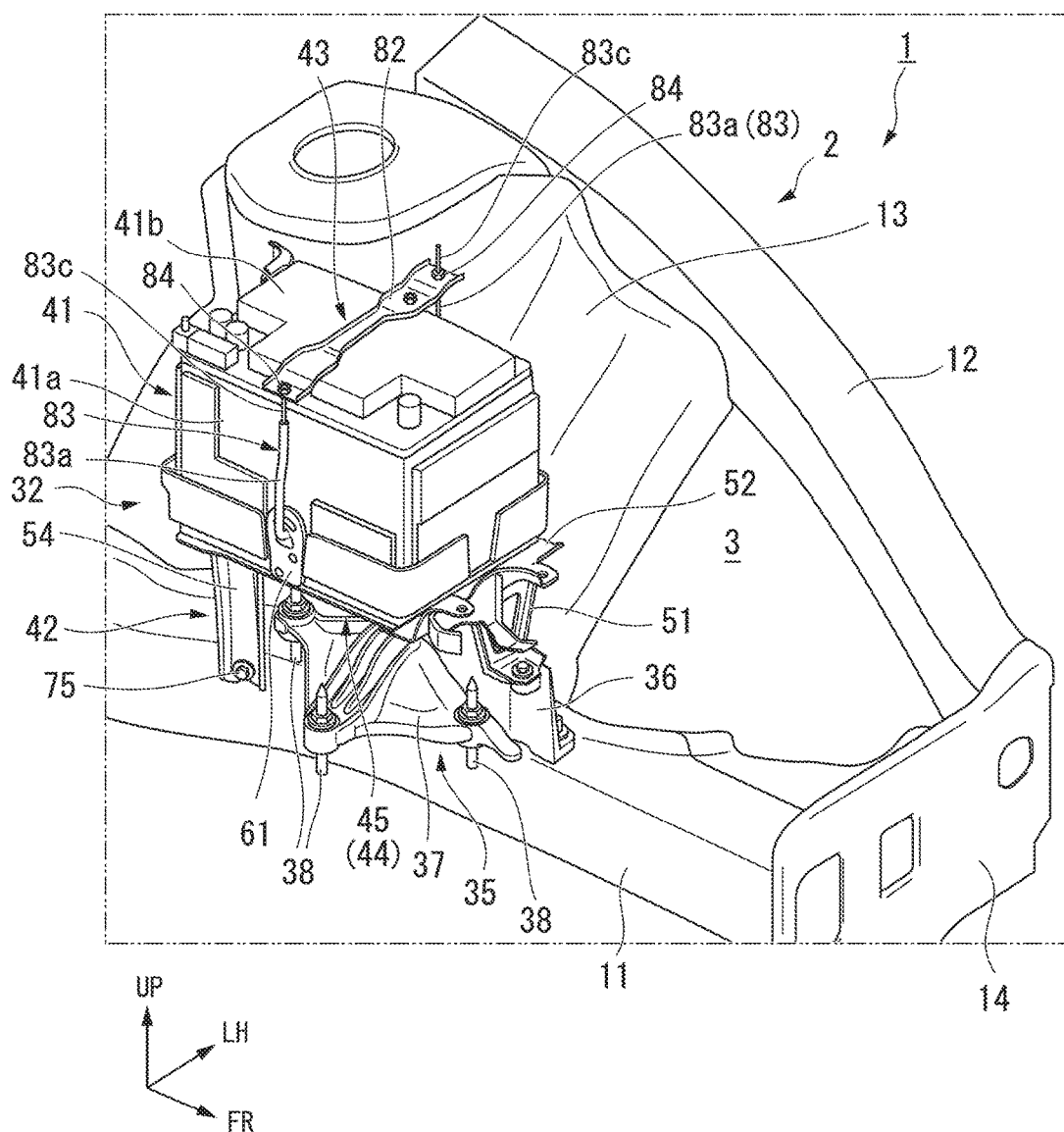
FIG. 1 is a perspective view showing a battery support structure according to an embodiment when seen from the inside in a vehicle width direction.

Hereinafter, an embodiment of the present invention will be described based on the accompanying drawings. In the following description, directions of front, rear, left, right, and so on, are the same as the front, rear, left, right directions and so on in a vehicle 1 described below unless the context clearly indicates otherwise. In addition, in the drawings, an arrow UP designates an upward direction, an arrow FR designates a forward direction, and an arrow LH designates a leftward direction.

FIG. 1 is a perspective view showing a battery support structure according to an embodiment when seen from the inside in a vehicle width direction.

As shown in FIG. 1, in the vehicle 1, an engine room 3 is formed at a front section of a vehicle body 2. A frame of the engine room 3 is formed by, for example, a dash board (not shown) or a front side frame 11, a sub-frame (not shown), an upper member 12, a damper housing 13, and so on.

The front side frame 11 is disposed at lower sections of the engine room 3 at both sides in the vehicle width direction. The front side frame 11 extends in a forward/rearward direction. The front side frame 11 is formed in a closed cross section in which a lateral cross section perpendicular to the forward/rearward direction has a rectangular shape. A rear end portion of the front side frame 11 is coupled to the dash board (not shown). The front end portion of the front side frame 11 is joined to a connecting plate 14.

The upper member 12 is disposed upper and outside in the vehicle width direction than the front side frame 11. The upper member 12 extends forward from a front pillar (not shown) to be inclined forward and downward. The front end portion of the front side frame 11 is joined to the connecting plate 14.

The damper housing 13 is disposed between the front side frame 11 and the upper member 12 and connected to the front side frame 11 and the upper member 12. The damper housing 13 separately supports front dampers (not shown). A lower end portion of the damper housing 13 is joined to an outer portion of a side surface of the front side frame 11 located outside in the vehicle width direction. Meanwhile, an upper end portion of the damper housing 13 is joined to an inner side of a side surface of the upper member 12 located inside in the vehicle width direction.

In the above-mentioned engine room 3, for example, a power plant (not shown), a battery unit 32, or the like, is accommodated.

The power plant includes an engine and a transmission connected to the engine (not of which is shown). The power plant is supported by a sub-frame from below.

In addition, in the above-mentioned front side frames 11, a transmission mount 35 (a mount section) is installed at the front side frame 11 disposed at one side in the vehicle width direction (a left side in an example shown). The transmission mount 35 supports the above-mentioned transmission (not shown) from above. The transmission mount 35 includes a base section 36 fixed to the upper surface of the front side frame 11 and the damper housing 13, and an overhanging section 37 overhanging from an upper section of the base section 36 toward the inside in the vehicle width direction. The overhanging section 37 is formed in a triangular shape protruding from the base section 36 toward the inside in the vehicle width direction in a plan view when seen from the upward/downward direction. A fastening member 38 fixed to the transmission is inserted in each corner portion of the overhanging section 37. Accordingly, the transmission is supported by the front side frame 11 via the transmission mount 35 from above.

The battery unit 32 has a battery 41 configured to supply power to various electrical components, a battery bracket 42 configured to support the battery 41, and a restriction member 43 (a locking part) configured to restrict the battery 41 to the battery bracket 42.

The battery 41 is formed in a rectangular parallelepiped shape. The battery 41 is held in the engine room 3 by the battery bracket 42 in a state in which a lateral direction is oriented in the vehicle width direction and a longitudinal direction is oriented in the forward/rearward direction.

Figure 2:
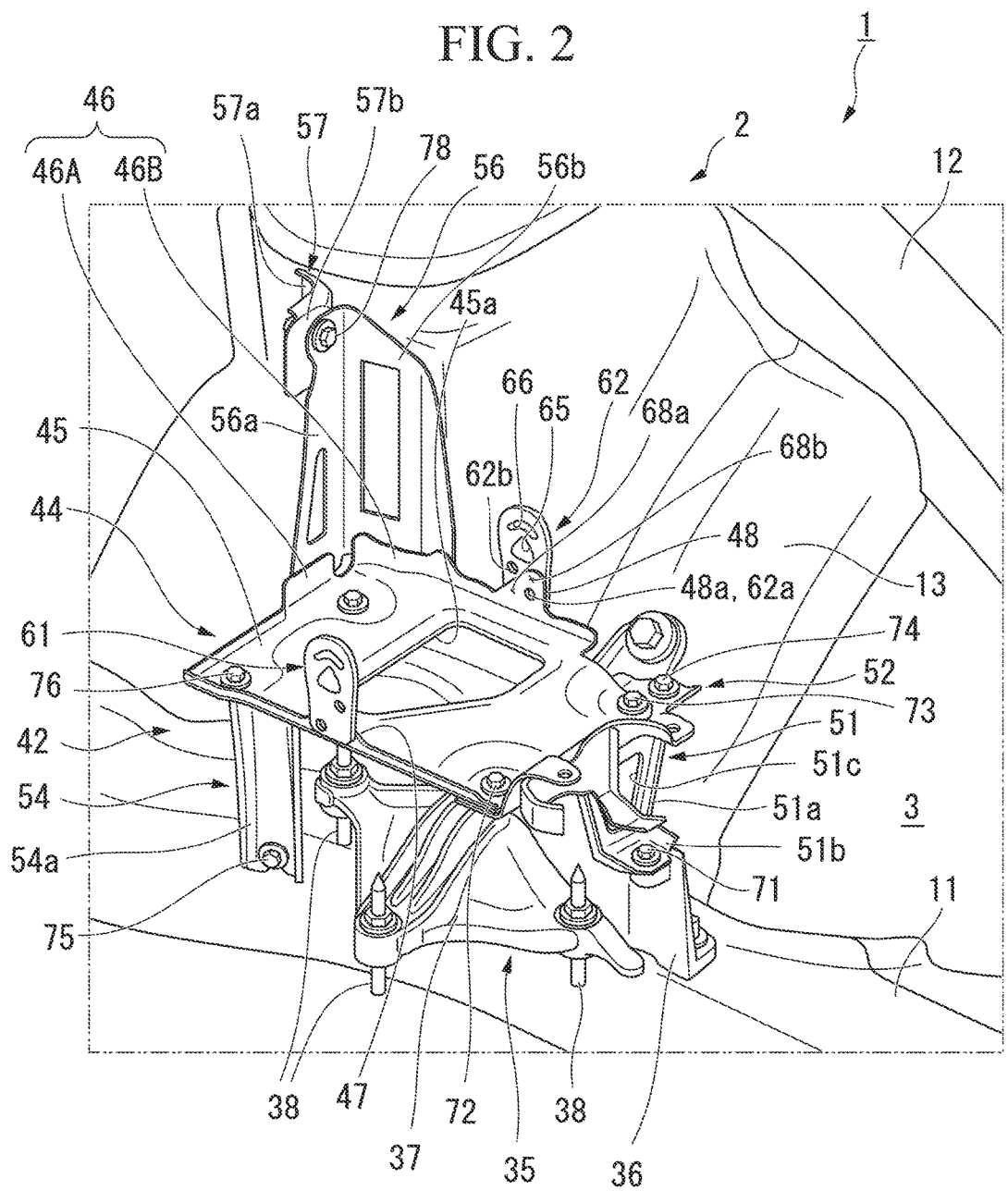
FIG. 2 is a perspective view showing the battery support structure according to the embodiment when seen from the inside in the vehicle width direction in a state in which a battery is removed.

FIG. 2 is a perspective view showing the battery support structure according to the embodiment when seen from the inside in the vehicle width direction in a state in which the battery is removed.

As shown in FIGS. 1 and 2, the battery bracket 42 includes a pedestal section 44 configured to come in contact with a bottom surface (a first surface) (not shown) of the battery 41 and support the battery 41 from below, and support members (a first bracket 51 to a seventh bracket 57, see FIG. 5) configured to support the pedestal section 44.

As shown in FIG. 2, the pedestal section 44 has a placing section 45 on which the battery 41 (see FIG. 1) is placed, a flange section 46 to which a sixth bracket 56 is joined, and a pair of fixing parts (a first fixing part 47 and a second fixing part 48) to which a pair of locking pieces (a first locking piece 61 (locking protruding part) and a second locking piece 62 (locking protruding part)) are joined, which will be described below. The placing section 45, the flange section 46 and the pair of fixing parts 47 and 48 are integrally formed by pressing a metal plate member.

The placing section 45 is formed in a rectangular shape corresponding to a shape of the battery 41 when seen in a plan view. A through-hole 45a is formed at a center of the placing section 45.

The flange section 46 includes a first flange 46A and a second flange 46B. The first flange 46A is bent upward from an end portion outside in the vehicle width direction of the rear end portion of the placing section 45. The second flange 46B is formed by being bent upward at the rear end portion of an end portion of the placing section 45 located outside in the vehicle width direction.

Figure 3:
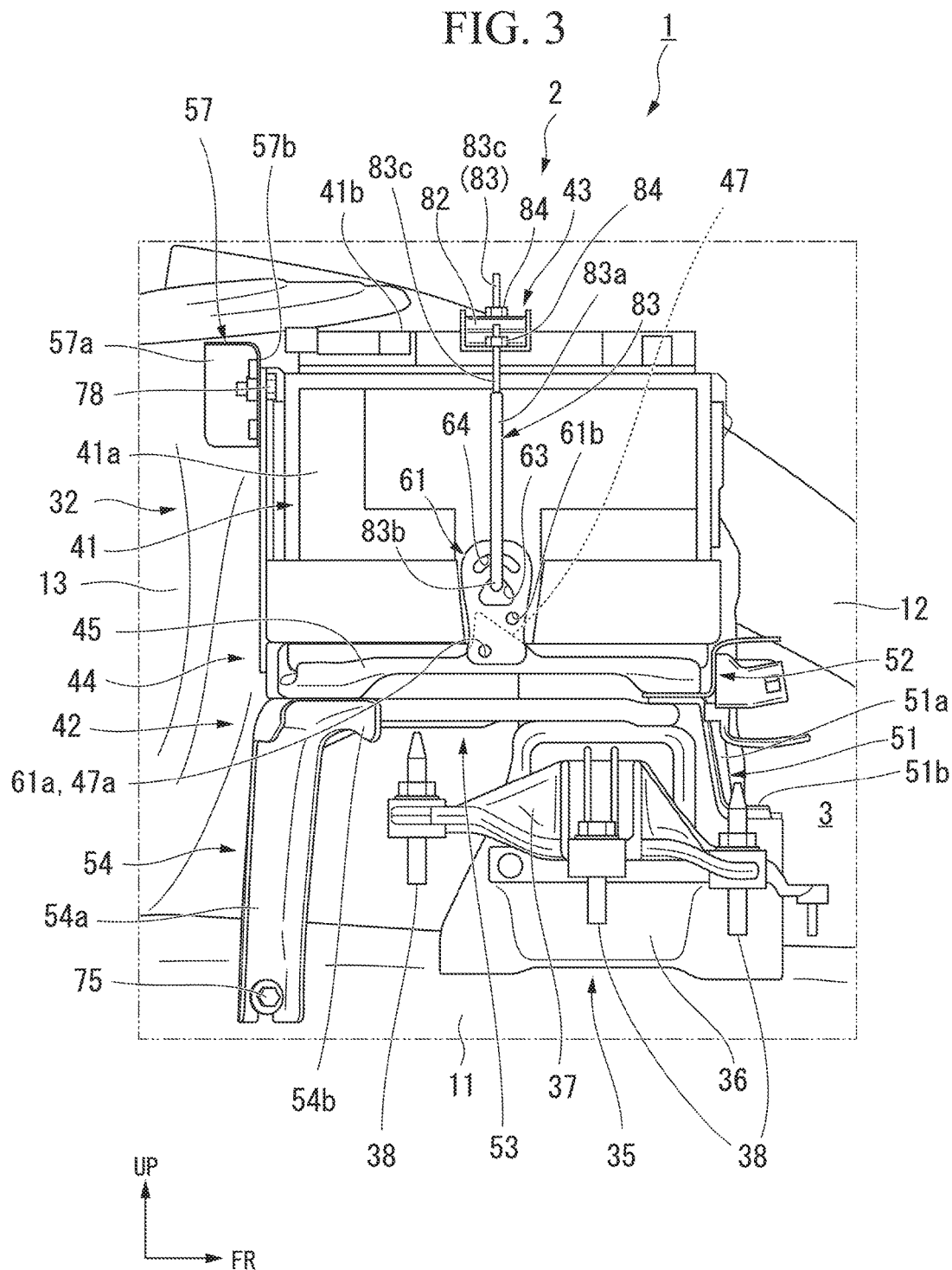
FIG. 3 is a perspective view for describing a partial configuration of the battery support structure according to the embodiment when the battery support structure according to the embodiment is seen from a forward side.

FIG. 3 is a side view of the battery support structure according to the embodiment when seen from the inside in the vehicle width direction.

As shown in FIG. 3, the first fixing part 47 is bent upward from a central portion in the forward/rearward direction of the end portion of the placing section 45 located inside in the vehicle width direction. The first fixing part 47 is formed in a triangular shape when seen from the vehicle width direction. The first fixing part 47 has a rear edge extending in the upward/downward direction, and a front edge gradually inclining forward as it goes from above to below. A hole 47a (a positioning section) that is configured to perform positioning of the circular first fixing part 47 and that is penetrating the first fixing part 47 in the vehicle width direction is formed at a rear end lower section of the first fixing part 47.

As shown in FIG. 2, the second fixing part 48 is formed by being bent upward at the central portion in the forward/rearward direction of the end portion of the placing section 45 located outside in the vehicle width direction. The second fixing part 48 is formed in a triangular shape when seen from the vehicle width direction. The second fixing part 48 has a front edge extending in the upward/downward direction, and a rear edge gradually inclining rearward as it goes from above to below. A hole 48a (a positioning section) that is configured to perform positioning of the circular second fixing part 48 and that is penetrating the second fixing part 48 in the vehicle width direction is formed at a front end lower section of the second fixing part 48.

Figure 4:
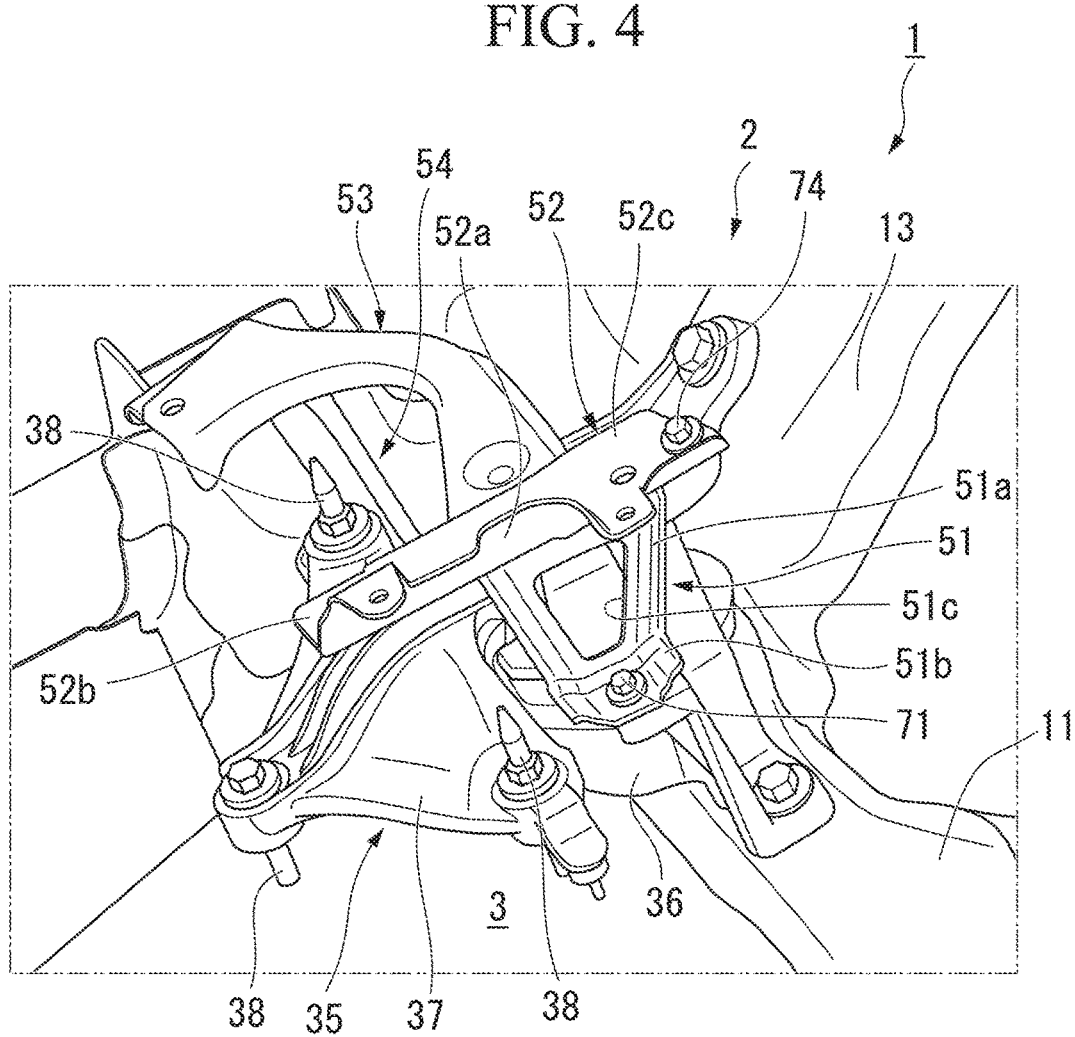
FIG. 4 is a perspective view showing the battery support structure according to the embodiment when seen from a rearward side in a state in which the battery is removed.
Figure 4:
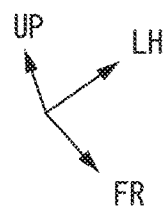
Figure 5:
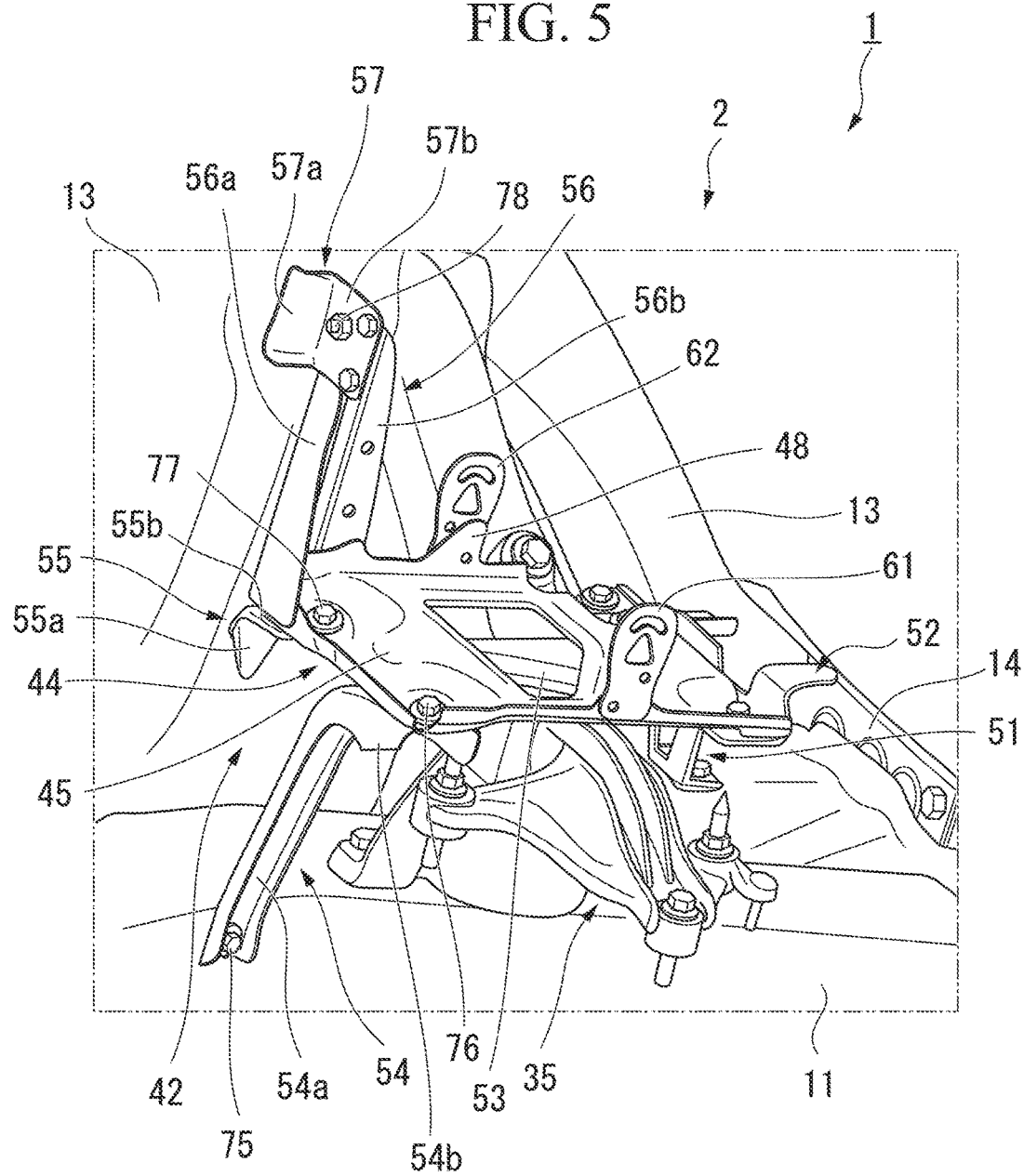
FIG. 5 is a side view showing the battery support structure according to the embodiment when seen from the inside in the vehicle width direction.
Figure 5:
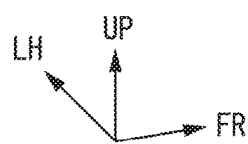

FIG. 4 is a perspective view for describing a partial configuration of the battery support structure according to the embodiment when the battery support structure according to the embodiment is seen from a forward side. FIG. 5 is a perspective view for describing a partial configuration of the battery support structure according to the embodiment when the battery support structure according to the embodiment is seen from a rearward side.

As shown in FIGS. 4 and 5, the support members (the first bracket 51 to the seventh bracket 57) are formed by pressing a metal plate member.

As shown in FIG. 4, the first bracket 51 (a mount section-side support member) is disposed below a front end portion of the pedestal section 44 (see FIG. 2). The first bracket 51 has a trapezoidal side plate section 51a having both main surfaces arranged to face the forward/rearward direction, a lower flange section 51b bent forward from a lower end of the side plate section 51a, and an upper flange section (not shown) bent rearward from an upper end of the side plate section 51a, and the side plate section 51a, the lower flange section 51b and upper flange section are integrally formed with each other. The side plate section 51a is formed such that a width in the vehicle width direction is gradually reduced as it goes from the upper end toward the lower end. A through-hole 51c configured to adjust stiffness of the first bracket 51 is formed in a central portion of the side plate section 51a. The lower flange section 51b is fastened and fixed to the base section 36 of the transmission mount 35 by a fastening member 71 such as a bolt, a nut, or the like.

The second bracket 52 is disposed above the first bracket 51. The second bracket 52 has a side plate section 52a having both main surfaces arranged to face the forward/rearward direction, a lower flange section 52b bent rearward from a lower end of the side plate section 52a, and an upper flange section 52c bent forward from an upper end of the side plate section 52a, and the side plate section 52a, the lower flange section 52b and the upper flange section 52c are integrally formed with each other. The side plate section 52a is disposed at the same position in the forward/rearward direction as that of the side plate section 51a of the first bracket 51. The lower flange section 52b is joined to an upper surface of an upper flange section (not shown) of the first bracket 51. End portions of both sides in the vehicle width direction of a front end portion of the pedestal section 44 (the placing section 45) are fastened and fixed to the lower flange section 52b by fastening members 72 and 73 (see FIG. 2). The outer portion of the end portion of the upper flange section 52c located outside in the vehicle width direction is fastened and fixed to the base section 36 of the transmission mount 35 by a fastening member 74.

A third bracket 53 is fixed to a lower surface of an upper flange section (not shown) of the first bracket 51. The third bracket 53 extends rearward from a position corresponding to a central portion in the vehicle width direction of the pedestal section 44 in the upper flange section of the first bracket 51 (see FIG. 2), then, bends toward the inside in the vehicle width direction, and extends toward the inside in the vehicle width direction. The third bracket 53 is formed in a U shape opened downward when seen from a lateral cross-sectional view. The upper surface of the third bracket 53 is formed in a planar shape in the horizontal direction.

A fourth bracket 54 (a frame-side support member) is disposed below the front end portion of the third bracket 53. As shown in FIG. 5, the fourth bracket 54 is formed in an L shape when seen from the forward/rearward direction. The fourth bracket 54 has an extension section 54a extending in the upward/downward direction, and a bent section 54b bent from the upper end of the extension section 54a toward the inside in the vehicle width direction, and the extension section 54a and the bent section 54b are integrally formed with each other. The extension section 54a is formed in a U shape opened toward the inside in the vehicle width direction. The lower end portion of the extension section 54a is fastened and fixed to a side surface facing the inside of the front side frame 11 in the vehicle width direction by a fastening member 75. The bent section 54b is formed in a U shape opened downward. An upper surface of the bent section 54b comes in contact with a lower surface of the front end portion of the third bracket 53. The outer end portion of the rear end portion of the pedestal section 44 (the placing section 45) located outside in the vehicle width direction is fastened and fixed to the bent section 54b together with the front end portion of the third bracket 53 by a fastening member 76.

A fifth bracket 55 (a frame-side support member) is disposed outside in the vehicle width direction than the fourth bracket 54. The fifth bracket 55 has a joining section 55a joined to the damper housing 13, and a bent section 55b bent from the upper end of the joining section 55a toward the inside in the vehicle width direction so as to be separated from the damper housing 13, and the joining section 55a and the bent section 55b are integrally formed with each other. The upper surface of the bent section 55b comes in contact with the lower surface of the inner end portion of the rear end portion of the pedestal section 44 (the placing section 45) located inside in the vehicle width direction. The inner end portion of the rear end portion of the pedestal section 44 (the placing section 45) located inside in the vehicle width direction is fastened and fixed to the bent section 55b by a fastening member 77.

The sixth bracket 56 (the frame-side support member) is disposed above the fifth bracket 55. As shown in FIG. 2, the sixth bracket 56 extends in the upward/downward direction and is formed in an L-shaped cross section perpendicular to the upward/downward direction. The sixth bracket 56 has a first side plate section 56*a* facing the forward/rearward direction and a second side plate section 56*b* facing the vehicle width direction, and the end portion of the first side plate section 56*a* located outside in the vehicle width direction and the rear side end portion of the second side plate section 56*b* are connected to each other. A front surface of a lower end portion of the first side plate section 56*a* is joined to a rear surface of the first flange 46A of the pedestal section 44.

An inner surface of the lower end portion of the second side plate section 56*b* located inside in the vehicle width direction is joined to an outer surface of the second flange 46B of the pedestal section 44 located outside in the vehicle width direction.

As shown in FIG. 5, the seventh bracket 57 (the frame-side support member) is disposed at the back of the upper end portion of the sixth bracket 56. The seventh bracket 57 has a joining section 57*a* joined to the damper housing 13 and a bent section 57*b* bent from the front end of the joining section 57*a* toward the inside in the vehicle width direction so as to be separated from the damper housing 13, and the joining section 57*a* and the bent section 57*b* are integrally formed with each other. The front surface of the bent section 57*b* comes in contact with the rear surface of the upper end portion of the first side plate section 56*a* of the sixth bracket 56. The upper end portion of the sixth bracket 56 is fastened and fixed to the bent section 57*b* by a fastening member 78.

In this way, the pedestal section 44 is fastened and fixed to the transmission mount 35 via the first bracket 51 (see FIG. 2). In addition, the pedestal section 44 is fastened and fixed to the front side frame 11 via the fourth bracket 54. Further, the pedestal section 44 is fastened and fixed to the damper housing 13 via the fifth bracket 55 to the seventh bracket 57.

In addition, as shown in FIG. 1, the first locking piece 61 and the second locking piece 62 are formed at the pedestal section 44.

The first locking piece 61 is joined to the first fixing part 47 (see FIG. 2) of the pedestal section 44. The first locking piece 61 is formed at a side surface 41*a* (a second surface) neighboring the bottom surface of the battery 41 and facing toward the inside in the vehicle width direction.

Figure 6:
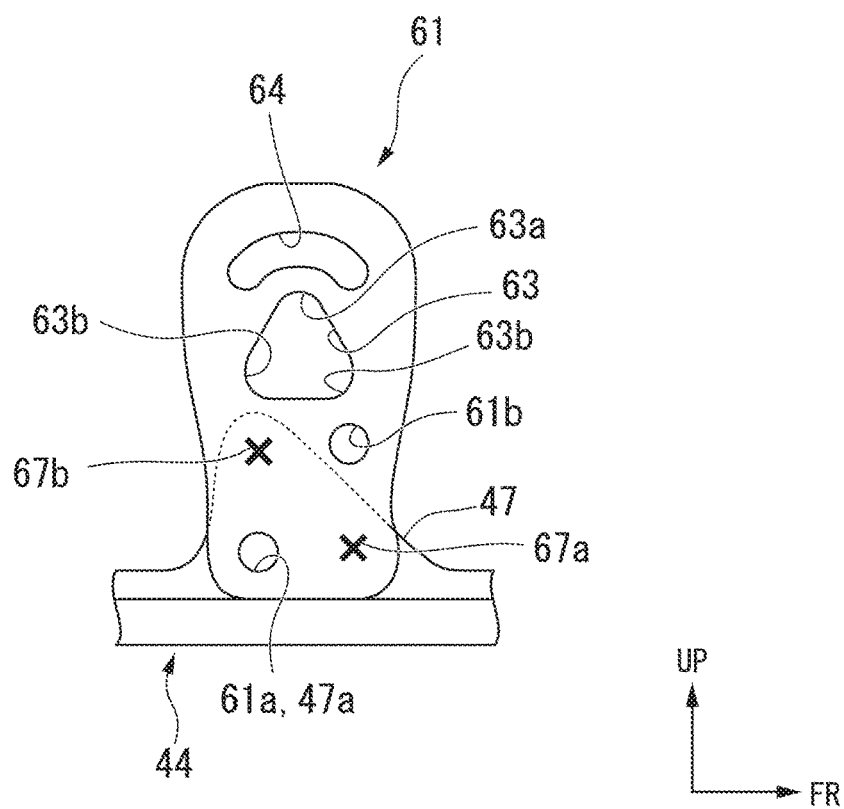
FIG. 6 is a side view showing a first locking piece according to the embodiment when seen from the inside in the vehicle width direction.

FIG. 6 is a side view of the first locking piece according to the embodiment when seen from the inside in the vehicle width direction.

As shown in FIG. 6, the first locking piece 61 is formed by pressing a metal plate member. The first locking piece 61 is formed in a planar shape in which both main surfaces face the vehicle width direction. The first locking piece 61 extends in the upward/downward direction, and the upper section is formed to be slightly wider than the lower section.

A first hole 61*a* (a positioning section) and a second hole 61*b* configured to perform positioning of the first locking piece are formed in the lower section of the first locking piece 61. The first hole 61*a* and the second hole 61*b* are formed in the same shape as the hole 47*a* of the first fixing part 47 of the pedestal section 44. The first hole 61*a* is formed in the rear section of the lower end portion of the first locking piece 61, and coincides with the hole 47*a* of the first fixing part 47 of the pedestal section 44 when seen from the vehicle width direction. The second hole 61*b* is disposed in front of and above the first hole 61*a*, and formed in front of the above-mentioned front edge of the first fixing part 47. The first hole 61*a* and the hole 47*a* are used to determine a relative position between the first locking piece 61 and the first fixing part 47. The second hole 61*b* is used to perform positioning of the attachment position, for example, when the first locking piece 61 is diverted to the vehicle body having a different configuration from the embodiment.

A first locking hole 63 and a second locking hole 64 are formed in the upper section of the first locking piece 61.

The first locking hole 63 is formed in a triangular shape having a width in the forward/rearward direction that is reduced from below to above. The first locking hole 63 includes an upper corner section 63*a* (an apex) and a pair of lower corner sections 63*b* disposed below the upper corner section 63*a*, and is formed in a symmetrical shape with respect to a centerline which extends in the upward/downward direction. The corner sections 63*a* and 63*b* of the first locking hole 63 are formed in an R shape.

The second locking hole 64 is formed on a straight line extending in the upward/downward direction that connects the upper corner section 63*a* of the first locking hole 63 and an upper surface 41*b* (a third surface, see FIG. 1) of the battery 41. The second locking hole 64 extends along an opening edge of the upper corner section 63*a* of the first locking hole 63 with a predetermined width and is curved in an arc shape. Both end portions of the second locking hole 64 are formed in a semi-circular shape. A width in the forward/rearward direction of the second locking hole 64 is equal to or larger than a width of the first locking hole 63 in the forward/rearward direction. A portion of the first locking piece 61 between the first locking hole 63 and the second locking hole 64 is formed to extend with a substantially constant width.

An upper edge (an outer edge portion) of the first locking piece 61 is formed in a curved line to form a protruding shape extending upward along the opening edge of the second locking hole 64 when seen from the vehicle width direction. A portion of the first locking piece 61 which is located above the second locking hole 64 is formed to extend with a substantially constant width.

The lower section of the first locking piece 61 is joined to the surface of the first fixing part 47 of the pedestal section 44 that faces the outside in the vehicle width direction. The first locking piece 61 and the first fixing part 47 are welded at a pair of welding sections 67*a* and 67*b*. The pair of welding sections 67*a* and 67*b* is formed next to each other so as to intersect in a forward/rearward direction (a second direction) and an upward/downward direction (a first direction). The pair of welding sections 67*a* and 67*b* are formed next to each other so that a straight line passing the welding sections 67*a* and 67*b* intersects with an axis line of a forward/rearward direction (a second direction) and an axis line of an upward/downward direction (a first direction). The pair of welding sections 67*a* and 67*b* are formed next to each other so that a straight line passing the welding sections 67*a* and 67*b* is inclined with respect to an axis line of a forward/rearward direction (a second direction) and an axis line of an upward/downward direction (a first direction). The welding section 67*a* is formed in front of the first hole 61*a* of the first locking piece 61 and the hole 47*a* of the first fixing part 47. The welding section 67*b* is formed at the back and above the welding section 67*a*, and formed above the first hole 61*a* of the first locking piece 61 and the hole 47*a* of the first fixing part 47.

As shown in FIG. 2, the second locking piece 62 is joined to the second fixing part 48 of the pedestal section 44. The second locking piece 62 is formed along the side surface (the second surface) (not shown) neighboring the bottom surface of the battery 41 (see FIG. 1) and facing the outside in the vehicle width direction. The second locking piece 62 has the same shape as the first locking piece 61.

A first hole 62a (a positioning section) and a second hole 62b configured to perform positioning of the second locking piece and corresponding to the first hole 61a and the second hole 61b (see FIG. 6) of the first locking piece 61 are formed in the second locking piece 62. The first hole 62a is formed in the front section of the lower end portion of the second locking piece 62 and coincides with the hole 48a of the second fixing part 48 of the pedestal section 44 when seen from the vehicle width direction. The second hole 62b is disposed at the back and above the first hole 62a and formed at the back of the above-mentioned rear edge of the second fixing part 48. The first hole 62a and the hole 48a are used to determine a relative position between the second locking piece 62 and the second fixing part 48.

A first locking hole 65 and a second locking hole 66 corresponding to the first locking hole 63 and the second locking hole 64 of the first locking piece 61 are formed in the upper section of the second locking piece 62. The first locking hole 65 is formed at the same position in the same shape as the first locking hole 63 of the first locking piece 61 when seen from the vehicle width direction. The second locking hole 66 is formed at the same position in the same shape as the second locking hole 64 of the first locking piece 61 when seen from the vehicle width direction.

The lower section of the second locking piece 62 is joined to the surface of the second fixing part 48 of the pedestal section 44 that faces the outside in the vehicle width direction. The second locking piece 62 and the second fixing part 48 are welded at a pair of welding sections 68a and 68b. The pair of welding sections 68a and 68b is formed next to each other so as to intersect in the forward/rearward direction and the upward/downward direction. The pair of welding sections 68a and 68b are formed next to each other so that a straight line passing the welding sections 68a and 68b intersects with the axis line of the forward/rearward direction and the axis line of the upward/downward direction. The pair of welding sections 68a and 68b is formed next to each other so that a straight line passing the welding sections 68a and 68b is inclined with respect to the axis line of the forward/rearward direction and the axis line of the upward/downward direction. The welding section 68a is formed at the back of the first hole 62a of the second locking piece 62 and the hole 48a of the second fixing part 48. The welding section 68b is disposed in front of and above the welding section 68a and formed above the first hole 62a of the second locking piece 62 and the hole 48a of the second fixing part 48.

As shown in FIG. 1, the restriction member 43 has a pressing plate 82 (a belt-shaped section) and a pair of fastening rods 83.

The pressing plate 82 is disposed above the battery 41 and comes in contact with the upper surface 41b (a third surface) of the battery 41. The pressing plate 82 extends in the vehicle width direction along the upper surface 41b of the battery 41 to cross the battery 41 in the vehicle width direction.

Figure 7:
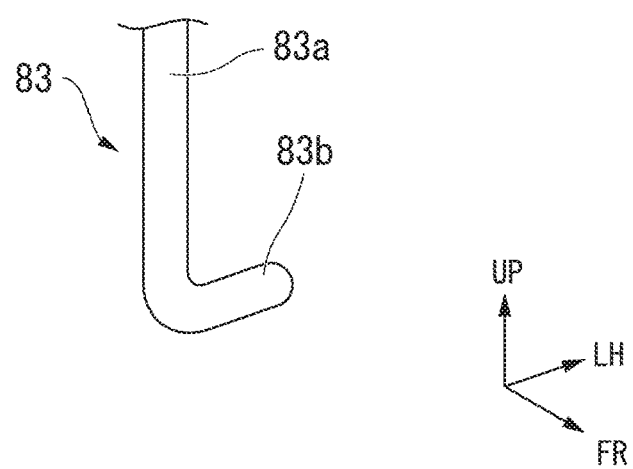
FIG. 7 is a perspective view of a fastening rod according to the embodiment.

FIG. 7 is a perspective view of a lower end portion of a fastening rod according to the embodiment. Further, in FIG. 7, the fastening rods 83 disposed inside in the vehicle width direction is shown.

The pair of fastening rods 83 is disposed at both sides in the vehicle width direction with respect to the battery 41. The fastening rods 83 have a main body section 83a (an extension section) extending along the side surface of the battery 41 in the upward/downward direction and a hook section 83b (an inserting part) bent at the lower end portion (see FIG. 7). As shown in FIG. 3, the hook section 83b of the fastening rod 83 disposed inside in the vehicle width direction is inserted in the first locking hole 63 of the first locking piece 61 from the inside in the vehicle width direction to be locked at the upper corner section 63a (see FIG. 6). As shown in FIG. 1, the hook section 83b (not shown in FIG. 1) of the fastening rods 83 disposed outside in the vehicle width direction is inserted in the first locking hole 65 (see FIG. 2) of the second locking piece 62 from the outside in the vehicle width direction to be locked at the corner section of the upper side. A diameter of an upper end portion 83c (a fastening section) of the main body section 83a of the fastening rod 83 is smaller than a diameter of the hook section 83b. The upper end portions 83c of the main body sections 83a of the fastening rods 83 are fastened to both end portions of the pressing plate 82 in the vehicle width direction by nuts 84. The fastening rods 83 are pulled upward by fastening the nuts at the upper end portions 83c.

In this way, the battery 41 is held at the battery bracket 42 in a state in which the battery 41 is sandwiched between the pedestal section 44 and the pressing plate 82 in the upward/downward direction. Further, a support structure of the battery 41 of the embodiment is constituted by the above-mentioned battery unit 32, and the front side frame 11 and the damper housing 13, which are disposed at one side in the vehicle width direction.

As described above in detail, in the support structure of the battery 41 of the embodiment, the second locking holes 64 and 66 are formed at the first locking piece 61 and the second locking piece 62 at positions deviated a predetermined distance upward from the first locking holes 63 and 65 (i.e., in a direction in which the battery 41 is separated from the pedestal section 44).

Here, for example, when a load is input from a forward side of the vehicle 1, there is possibility that the front side frame 11 is folded at below the battery 41 and the front side frame 11 is pushed up to raise the battery 41 upward via the pedestal section 44. In this way, when an external force directed upward is applied to the battery 41 and an inertial force in a direction getting away from the pedestal section 44 is applied to the battery 41, a force in an upward direction is applied to the restriction member 43 (the pressing plate 82) in contact with the upper surface 41b of the battery 41. Here, the restriction member 43 (the fastening rods 83) includes the hook section 83b configured to be inserted into the first locking holes 63 and 65 formed in the first locking piece 61 and the second locking piece 62. For this reason, when a force is applied to the restriction member 43, the first locking piece 61 and the second locking piece 62 may be broken by the hook section 83b.

According to the embodiment, since the second locking holes 64 and 66 are formed in the first locking piece 61 and the second locking piece 62 at positions deviated a predetermined distance upward from the first locking holes 63 and 65, even when the force in the upward direction is applied to the restriction member 43 (the pressing plate 82) and breakage caused by cracks due to a load from the hook section 83b occurs at portions of the first locking piece 61 and the second locking piece 62 located above the first locking holes 63 and 65 among the surroundings of the first locking holes 63 and 65, it is possible to stop the advance of the cracks at the second locking holes 64 and 66 and to prevent the first locking piece 61 and the second locking piece 62 from being completely broken. Accordingly, since the hook section 83b is inserted in the second locking holes 64 and 66, locking between the restriction member 43 (the fastening rods 83) and the first locking piece 61 and the second locking piece 62 can be maintained, and upward displacement of the battery 41 can be restricted. Accordingly, the battery 41 can be stably held.

In addition, since the first locking hole 63 of the first locking piece 61 has a width reduced from below to above, the lower section of the first locking hole 63 is wider than the upper section, and the hook section 83*b* can be easily inserted in the lower section of the first locking hole 63. In addition, as the hook section 83*b* is displaced upward by fastening the nuts engaged with the fastening rods 83, or the like, the hook section 83*b* can be guided to the upper corner section 63*a* of the first locking hole 63, and the hook section 83*b* can be securely locked to a defined position (the upper corner section 63*a*). Accordingly, improvement of workability of inserting the hook section 83*b* into the first locking hole 63 and improvement of fixing strength between the first locking hole 63 and the hook section 83*b* are compatible. The first locking hole 65 of the second locking piece 62 is also the same as described above.

In addition, the second locking hole 64 of the first locking piece 61 is formed on a straight line that connects the upper corner section 63*a* of the first locking hole 63 and the upper surface 41*b* of the battery 41. Accordingly, since a place in the first locking hole 63 at which the cracks caused by the load from the hook section 83*b* begin is restricted to the upper corner section 63*a* and the second locking hole 64 is formed at this corresponding portion, advance of the cracks advancing upward from the upper corner section 63*a* can be reliably stopped at the second locking hole 64. Accordingly, complete breakage of the first locking piece 61 can be more securely prevented. The second locking piece 62 is also the same as described above.

In addition, since the second locking hole 64 is formed in the first locking piece 61 along the opening edge of the first locking hole 63, a portion of the first locking piece 61 between the first locking hole 63 and the second locking hole 64 is formed to extend with a substantially constant width. Accordingly, a load from the hook section 83*b* inserted in the first locking hole 63 can be distributed in the portion between the first locking hole 63 and the second locking hole 64. Accordingly, stress concentration to the portion between the first locking hole 63 and the second locking hole 64 can be prevented and strength with respect to the breakage can be improved. Accordingly, locking between the restriction member 43 (the fastening rods 83) and the first locking piece 61 can be maintained and upward displacement of the battery 41 can be restricted. The second locking piece 62 is also the same as described above. Accordingly, the battery 41 can be stably held.

In addition, since the upper edge of the first locking piece 61 is formed along the opening edge of the second locking hole 64, the portion of the first locking piece 61 located above the second locking hole 64 is formed to extend with a substantially constant width. Accordingly, when the hook section 83*b* is inserted in the second locking hole 64, the load from the hook section 83*b* can be distributed in the portion of the first locking piece 61 located above the second locking hole 64. Accordingly, stress concentration to the portion of the first locking piece 61 above the second locking hole 64 can be prevented, and strength with respect to the breakage can be improved. Accordingly, locking between the restriction member 43 (the fastening rods 83) and the first locking piece 61 can be maintained, and upward displacement of the battery 41 can be restricted. The second locking piece 62 is also the same as described above. Accordingly, the battery 41 can be stably held.

In addition, since the pair of welding sections 67*a* and 67*b* is formed at the first locking piece 61 to intersect in the forward/rearward direction, the pedestal section 44 and the first locking piece 61 can be strongly fixed with respect to the load in the upward/downward direction. Since the pair of welding sections 67*a* and 67*b* are formed at the first locking piece 61 so that the a straight line passing the welding sections 67*a* and 67*b* intersects with the axis line of the forward/rearward direction, the pedestal section 44 and the first locking piece 61 can be strongly fixed with respect to the load in the upward/downward direction. Since the pair of welding sections 67*a* and 67*b* are formed at the first locking piece 61 so that the a straight line passing the welding sections 67*a* and 67*b* is inclined with respect to the axis line of the forward/rearward direction, the pedestal section 44 and the first locking piece 61 can be strongly fixed with respect to the load in the upward/downward direction. For this reason, even when an inertial force in a direction of upward displacement is applied to the battery 41 and a force in the upward/downward direction is applied to the first locking piece 61 via the restriction member 43, the first locking piece 61 can be prevented from being separated from the pedestal section 44.

Further, since the pair of welding sections 67*a* and 67*b* is formed to intersect in the upward/downward direction, strength with respect to separation of the first locking piece 61 from the pedestal section 44 due to the load in the upward/downward direction can be maintained. Since the pair of welding sections 67*a* and 67*b* are formed so that the straight line passing the welding sections 67*a* and 67*b* intersects with the axis line of the upward/downward direction, strength with respect to separation of the first locking piece 61 from the pedestal section 44 due to the load in the upward/downward direction can be maintained. Since the pair of welding sections 67*a* and 67*b* are formed so that the straight line passing the welding sections 67*a* and 67*b* is inclined with respect to the axis line of the upward/downward direction, strength with respect to separation of the first locking piece 61 from the pedestal section 44 due to the load in the upward/downward direction can be maintained. Accordingly, separation of the first locking piece 61 from the pedestal section 44 can be prevented. The second locking piece 62 is also the same as described above.

Accordingly, a position of the restriction member 43 with respect to the pedestal section 44 can be fixed and upward displacement of the battery 41 can be suppressed. Accordingly, the battery 41 can be stably held.

In addition, since the positioning holes (the hole 47*a* and the first hole 61*a*) are formed in the pedestal section 44 and the first locking piece 61 at common positions, assembly precision between the pedestal section 44 and the first locking piece 61 can be improved. The pedestal section 44 and the second locking piece 62 are also the same as described above. Accordingly, the battery support structure having a small production tolerance can be provided.

In addition, since the pedestal section 44 is fixed to the transmission mount 35 via the first bracket 51, the pedestal section 44 can be fixed to the front side frame 11 via the transmission mount 35 without largely increasing the number of components between the pedestal section 44 and the front side frame 11. Accordingly, the battery 41 can be stably supported.

Further, since the pedestal section 44 is fixed to the front side frame 11 and the damper housing 13 via the fifth bracket 55 to the seventh bracket 57, the battery 41 can be supported by both of the front side frame 11 and the damper housing 13. Accordingly, the battery 41 can be stably supported.

In addition, a diameter of the upper end portion 83*c* of the fastening rods 83 fastened to the pressing plate 82 is smaller than a diameter of the hook section 83*b*. Accordingly, even when the diameter of the hook section 83*b* is increased in order to prevent the hook section 83*b* from being buckled and being separated from the locking pieces 61 and 62 before the occurrence of the cracks in the first locking holes 63 and 65 due to the load from the hook section 83*b*, a torque of the nut fastening in the upper end portions 83*c* of the fastening rods 83 can be held at a relatively small level. Accordingly, improvement of the strength and improvement of workability of the hook section 83*b* are compatible.

Further, the present invention is not limited to the above-mentioned embodiment described with reference to the accompanying drawings but various variants may be considered without departing from the technical scope of the present invention.

For example, in the embodiment, while the battery 41 is disposed in a state in which a lateral direction is oriented in the vehicle width direction and a longitudinal direction is oriented in the forward/rearward direction, the embodiment is not limited thereto but a direction in which the battery 41 is disposed may be appropriately varied. Even in this case, as the first locking piece 61 and the second locking piece 62 are disposed along the side surface that faces a direction perpendicular to the upward/downward direction of the battery 41, the above-mentioned effects can be exhibited.

In addition, in the embodiment, while the pedestal section 44, the first locking piece 61 and the second locking piece 62 are formed separately from each other, the embodiment is not limited thereto but the pedestal section, the first locking piece and the second locking piece may be formed integrally with each other.

In addition, in the embodiment, while the first locking holes 63 and 65 are formed in a triangular shape, the embodiment is not limited thereto but the shape may be appropriately varied to, for example, a circular shape, or the like. The second locking holes 64 and 66 are also the same as described above.

In addition, in the embodiment, while a pair of welding sections are formed between the first locking piece 61 and the first fixing part 47, the embodiment is not limited thereto but the welding sections may be disposed at three places or more and may be formed next to each other so as to intersect in the forward/rearward direction and the upward/downward direction. In the embodiment, the welding sections may be disposed at three places or more and may be formed next to each other so that an approximate straight line of the welding sections intersects with the axis line of the forward/rearward direction and the axis line of the upward/downward direction. In the embodiment, the welding sections may be disposed at three places or more and may be formed next to each other so that an approximate straight line of the welding sections is inclined with respect to the axis line of the forward/rearward direction and the axis line of the upward/downward direction. In addition, the welding section may extend to intersect in the forward/rearward direction and the upward/downward direction. The welding section may extend to intersect with the axis line of the forward/rearward direction and the axis line of the upward/downward direction. The welding section may extend to be inclined with respect to the axis line of the forward/rearward direction and the axis line of the upward/downward direction. The welding sections between the second locking piece 62 and the second fixing part 48 are also the same as described above.

In addition, the components of the above-mentioned embodiment may be appropriately substituted with known components without departing from the scope of the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A battery support structure comprising:
   a pedestal section configured to come in contact with at least a portion of a first surface of a battery in order to support the battery;
   a locking protruding part formed at the pedestal section so as to be disposed along a second surface of the battery neighboring the first surface when the battery is supported on the pedestal section;
   a locking part that includes an inserting part arranged to be inserted in a first locking hole formed in the locking protruding part and that is configured to come in contact with at least a portion of a third surface of the battery facing the opposite side of the first surface when the battery is supported on the pedestal section; and
   a welding section fixed in a state in which the locking protruding part and the pedestal section are welded to each other,
   wherein the battery is supported in a state in which the inserting part is inserted in the first locking hole,
   a second locking hole is formed in the locking protruding part at a position deviated a predetermined distance from the first locking hole toward a side closer to the third surface of the battery when the battery is supported on the pedestal section, and
   the welding section is formed so as to intersect in a first direction and a second direction, the first direction being a direction parallel with a plane of the first surface of the battery and a plane of the third surface of the battery when the battery is supported on the pedestal section, and the second direction being a direction perpendicular to the first direction.

2. The battery support structure according to claim 1, wherein the first locking hole is formed such that a width thereof decreases from a side closer to the first surface toward a side closer to the third surface of the battery when the battery is supported on the pedestal section.

3. The battery support structure according to claim 2, wherein the first locking hole is formed to have at least one apex at a side closer to the third surface of the battery when the battery is supported on the pedestal section, and
   the second locking hole is formed on a straight line that connects the apex and the third surface of the battery when the battery is supported on the pedestal section.

4. The battery support structure according to claim 1, wherein the second locking hole is formed along an edge of the locking protruding part defining an opening of the first locking hole.

5. The battery support structure according to claim 1, wherein a portion of an outer edge portion of the locking protruding part that locates closer to the third surface of the battery when the battery is supported on the pedestal section than the second locking hole is formed so as to extend along an edge of the locking protruding part defining an opening of the second locking hole.

6. The battery support structure according to claim 1, wherein a positioning section configured to determine a relative position between the pedestal section and the locking protruding part is formed at the pedestal section and the locking protruding part.

7. The battery support structure according to claim 1, comprising:
a mount section that is fixed to a front side frame extending in a vehicle forward/rearward direction and that is configured to support a power plant,
wherein the pedestal section is fixed to the mount section via a mount section-side support member.

8. The battery support structure according to claim 1, wherein the pedestal section is fixed to a front side frame and a damper housing via a frame-side support member, the front side frame extending in the vehicle forward/rearward direction, and the damper housing being connected to an outer portion of the front side frame located outside in the vehicle width direction.

9. The battery support structure according to claim 1, wherein the locking part includes:
a belt-shaped section formed along the third surface of the battery when the battery is supported on the pedestal section; and
an extension section that extends from the inserting part along the second surface of the battery when the battery is supported on the pedestal section, and that is fastened to the belt-shaped section by a nut at a fastening section, and
a diameter of the extension section in the vicinity of the fastening section is smaller than a diameter of the inserting part.

10. A battery support structure comprising:
a pedestal section configured to come in contact with at least a portion of a first surface of a battery in order to support the battery;
a locking protruding part formed at the pedestal section so as to be disposed along a second surface of the battery neighboring the first surface when the battery is supported on the pedestal section; and
a locking part that includes an inserting part arranged to be inserted in a first locking hole formed in the locking protruding part and that is configured to come in contact with at least a portion of a third surface of the battery facing the opposite side of the first surface when the battery is supported on the pedestal section,
wherein the battery is supported in a state in which the inserting part is inserted in the first locking hole,
a second locking hole is formed in the locking protruding part at a position deviated a predetermined distance from the first locking hole toward a side closer to the third surface of the supported battery when the battery is supported on the pedestal section,
the first locking hole is formed to have at least one apex at a side closer to the third surface of the battery when the battery is supported on the pedestal section, and
the second locking hole is formed on a straight line that connects the apex and the third surface of the battery when the battery is supported on the pedestal section, is formed to extend along an edge the locking protruding part defining an opening of first locking hole at the apex, and is curved in an arc shape.

11. A battery support structure comprising:
a pedestal section configured to come in contact with at least a portion of a first surface of a battery in order to support the battery;
a locking protruding part formed at the pedestal section so as to be disposed along a second surface of the battery neighboring the first surface when the battery is supported on the pedestal section;
a locking part that includes an inserting part arranged to be inserted in a first locking hole formed in the locking protruding part and that is configured to come in contact with at least a portion of a third surface of the battery facing the opposite side of the first surface when the battery is supported on the pedestal section; and
a mount section that is fixed to a front side frame extending in a vehicle forward/rearward direction and that is configured to support a power plant;
wherein the battery is supported in a state in which the inserting part is inserted in the first locking hole,
the pedestal section is fixed to the mount section via a mount section-side support member,
a second locking hole is formed in the locking protruding part at a position deviated a predetermined distance from the first locking hole toward a side closer to the third surface of the battery when the battery is supported on the pedestal section,
the first locking hole is formed to have at least one apex at a side closer to the third surface of the battery when the battery is supported on the pedestal section,
the second locking hole is formed on a straight line that connects the apex and the third surface of the battery when the battery is supported on the pedestal section, is formed to extend along an edge the locking protruding part defining an opening of first locking hole at the apex, and is curved in an arc shape,
the locking part includes:
a belt-shaped section formed along the third surface of the battery when the battery is supported on the pedestal section; and
an extension section that extends from the inserting part along the second surface of the battery when the battery is supported on the pedestal section and that is fastened to the belt-shaped section by a nut at a fastening section, and
a diameter of the extension section in the vicinity of the fastening section is smaller than a diameter of the inserting part.

\* \* \* \* \*